United States Patent [19]
La Rue, Jr.

[11] 3,887,393
[45] June 3, 1975

[54] BATTERY HOLDER ASSEMBLY

[75] Inventor: Mervin W. La Rue, Jr., Barrington, Ill.

[73] Assignee: Bell & Howell Company, Chicago, Ill.

[22] Filed: Dec. 15, 1972

[21] Appl. No.: 315,387

[52] U.S. Cl. .............................................. 136/173
[51] Int. Cl. ............................................. H01m 1/00
[58] Field of Search ............ 136/173, 166, 131, 132

[56] References Cited
UNITED STATES PATENTS

| | | | |
|---|---|---|---|
| 1,036,597 | 8/1912 | Fisk | 136/173 |
| 2,397,469 | 4/1946 | Casanov | 136/173 P |
| 3,553,033 | 1/1971 | Page | 136/173 |
| 3,563,807 | 2/1971 | Brindley et al. | 136/173 |

*Primary Examiner*—John H. Mack
*Assistant Examiner*—H. A. Feeley

[57] ABSTRACT

A battery holder assembly for holding a cluster of four elongate battery cells in the handle of a battery-powered movie camera or the like. The complete assembly includes a removable cassette for receiving and retaining the four battery cells in a side-by-side assembled relationship. The cassette, in turn, is received within a housing formed by the handle. In the battery holder assembly disclosed, electrical connection will not be completed with a battery cell that is improperly inserted in reversed polarity orientation.

4 Claims, 10 Drawing Figures

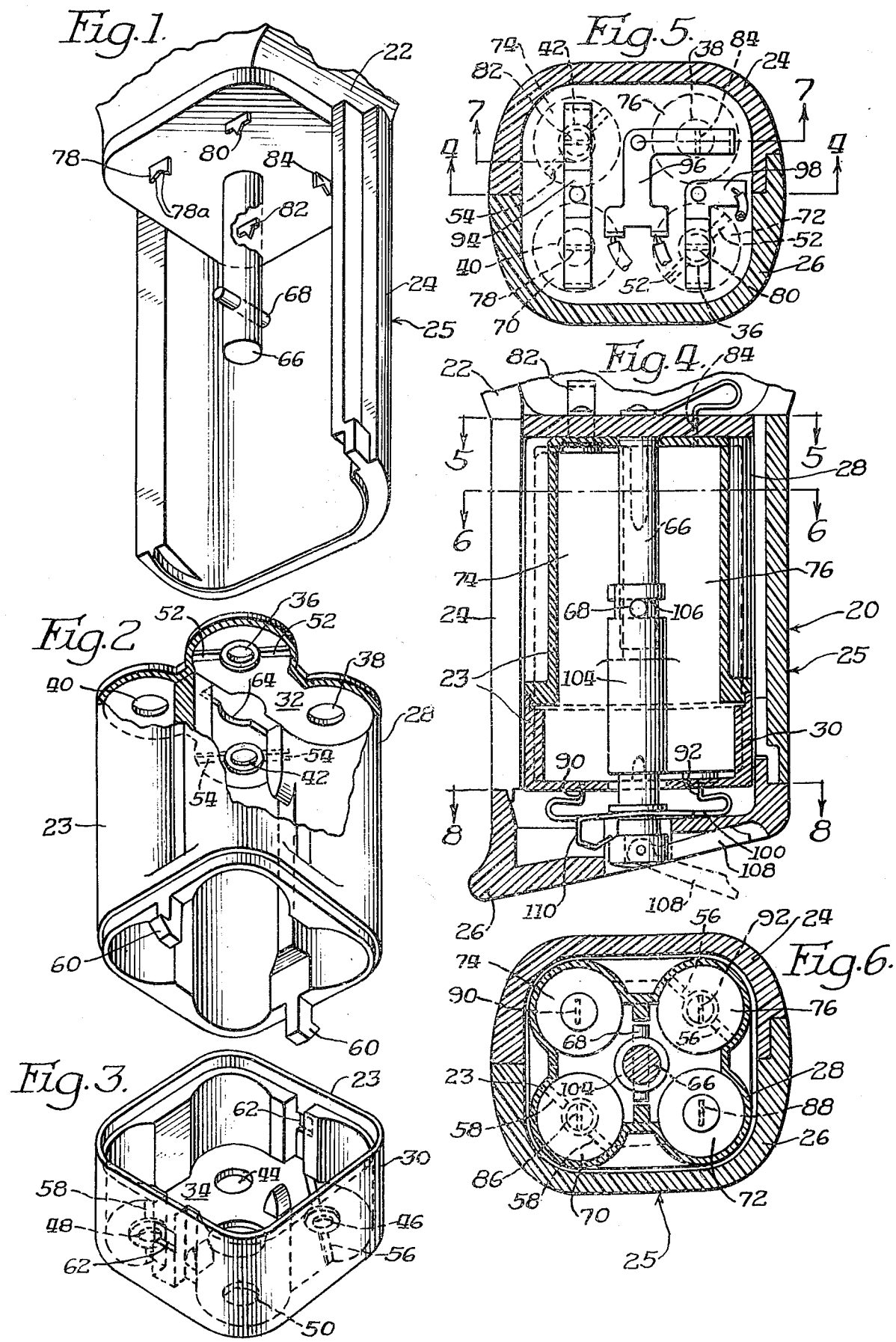

BATTERY HOLDER ASSEMBLY

This invention relates generally to retainers for holding plurality of batteries and, in particular, to a multicell battery holder assembly for the handle of a movie camera or the like.

A principal object of this invention is to provide a battery holder assembly which is foolproof in the sense that it will not permit a completed electrical connection with any battery cell that is improperly inserted into the holder assembly in reversed polarity orientation. This is achieved by end walls in the assembly which provide for each battery cell a pair of aligned contact receiving apertures in cooperation with spacer means providing a raised surface region on the interior surface of the end walls adjacent a predetermined one of each of the pair of aligned contact-receiving apertures and configured to form a socket for receiving the protruding positive battery terminal only. If a battery cell is improperly inserted into the assembly in reversed polarity orientation, its flat negative terminal will not be received within the positive terminal socket but rather will abut against the associated raised surface on the end wall and will be thur prevented from contacting the electrical contact member which extends into the associated contact receiving aperture.

It is also a principal object of this invention to provide a battery holder assembly which is convenient and easy to use. A removable, elongate cassette is provided for receiving multiple battery cells in a clustered side-by-side assembled relationship. The cassette comprises an elongate portion and a detachable cap portion which is attachable to the elongate portion in only two possible 180° axially-rotated orientations to insure the proper relationship of the contact-receiving apertures in the base and cap portions. When the cassette is loaded with the requisite number of battery cells, it is simply inserted into one portion of a two-piece receiver housing which is formed by the handle of the battery-powered device itself. The second portion of the receiver is engaged in place to secure the cassette and establish electrical connection between the battery cell terminals and corresponding electrical contacts which are mounted in the receiver housing to enter the contact-receiving apertures. The cassette is preferably insertable into the receiver housing in only two possible 180° axially-rotated orientations to insure correct association of the electrical contacts and the multiple battery cell terminals.

The foregoing objects and other features and objects of the present invention will be better understood by reference to the following detailed description taken in conjunction with the accompanying drawings.

In the drawings:

FIG. 1 is an isometric view of one portion of a battery holder receiver housing.

FIG. 2 is an isometric view of one portion of a battery retaining cassette.

FIG. 3 is an isometric view of a second portion of a battery retaining cassette.

FIG. 4 is a cross-sectional view of the complete battery assembly taken at lines 4—4 of FIG. 5.

FIG. 5 is a cross-sectional view taken at lines 5—5 of FIG. 4.

FIG. 6 is a cross-sectional view taken at lines 6—6 of FIG. 4.

Figure 7:
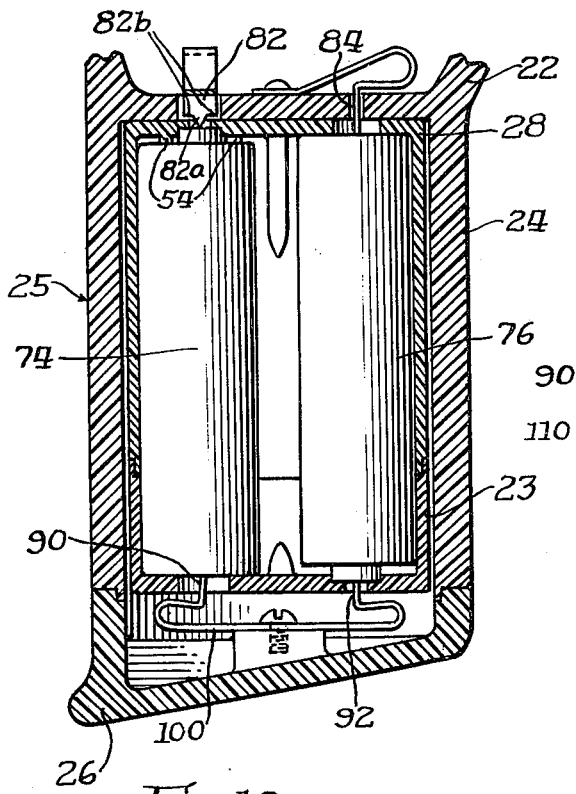
FIG. 7 is a cross-sectional view taken at lines 7—7 of FIG. 5.

Referring first to FIGS. 4 and 6, the battery holder assembly 20 is shown as part of the handle or pistol grip 22 of a battery-powered motion picture camera. Briefly, the battery holder assembly 20 comprises a cassette 23 for holding multiple battery cells and a housing 25 enclosing a space within the handle 22 for receiving the cassette 23. The housing comprises a first portion 24 which as best illustrated in FIG. 1 is rigidly affixed to, or integral with, the body of the handle 22 and a complementary second portion 26 which is detachably secured to the first housing portion 24 as illustrated in FIGS. 5 and 6.

Turning now to FIGS. 2 and 3, the battery holding cassette 23 is shown in detail. As seen, the cassette 23 comprises an elongate portion 28 which is detachably securable to a cap portion 30 by latching tabs 60 and cooperating latching tab apertures 62. The side walls of the elongate portion 28 should be sufficiently resilient to permit the latching tabs 60 to be engaged and disengaged with the apertures 62 by pressing inwardly on the associated side walls of the portion 28. As illustrated, portions 28 and 30 of the cassette are configured to cooperate to form a cluster of four elongate compartments for enclosing and retaining four battery cells in side-by-side parallel relationship. The end walls 32 and 34 of the two portions 28 and 30 of the cassette are each provided with four contact-receiving apertures. In particular, the end wall 32 is provided with four contact-receiving apertures 36, 38, 40, and 42, each of which is arranged to axially align with one of the four battery cell compartments and with a complementary one of the four contact receiving apertures 44, 46, 48, and 50 provided in the opposing end wall 34.

Figure 10:
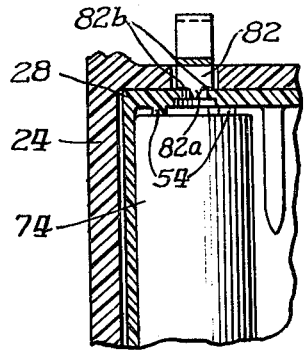
FIG. 10 is an enlarged view of a portion of FIG. 7.

The apertures 36, 42, 46, and 48 are preferably each formed in a socket recessed in the surface of the associated end wall as depicted in FIGS. 2 and 3. The sockets for the apertures 36, 42, 46, and 48 are further formed by the respective adjacent raised and diametrically positioned spacer block pairs 52, 54, 56, and 58. In this manner, the interior wall surface region adjacent each of the apertures 36, 42, 46, and 48 is configured to form a socket for receiving only the protruding positive terminal of the battery cell (in the manner illustrated in FIGS. 7 and 10) and not the larger diameter negative terminal surface at the opposite end of the battery cell. The purpose of this arrangement is to prevent electrical contact from being made with the negative terminal of any battery cell which is inserted into the cassette 23 misoriented with its negative terminal surface against one of the spacer blocks 52, 54, 56, or 58.

It should be noted that the positive terminal contact apertures 36 and 42 on the cassette end wall 32 are diagonally positioned with respect to one another, and that the positive terminal contact apertures 46 and 48 on the cassette end wall 34 are also diagonally positioned with respect to one another. Moreover, the arrangement of the locking tabs 60 on the elongate portion 28 of the cassette and the cooperating locking tabe receiving apertures 62 on the cap portion 30 permits the portions 28 and 30 to be locked together in only two possible 180° rotated orientations. This insures that the cassette 23 when assembled with always have a positive terminal contact aperture in paired alignment with a negative contact terminal aperture.

Figure 9:
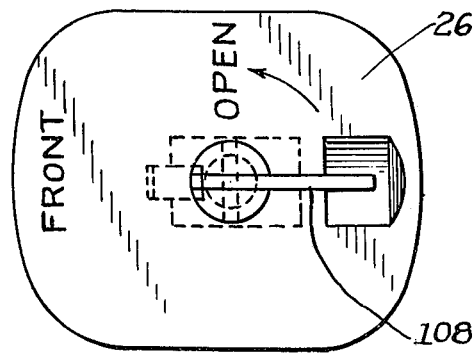
FIG. 9 is a bottom elevation of the battery holding assembly of FIG. 4.

As previously noted, the cassette 23 is designed to be longitudinally received within a receiver housing 25 formed as part of the handle 22 of a battery-powered motion picture camera. In the particular embodiment disclosed, the housing 25 comprises a fixed portion 24 which is fixedly attached to or integral with the handle 22 and which defines the top surface of the receiving housing containing terminal contacts 78, 80, 82, and 84, as well as the axially positioned alignment and connecting bayonet shaft 66. The housing 25 further comprises a complementary detachable portion 26 which defines the bottom surface of the receiver housing containing the terminal contacts 86, 88, 90, and 92 and the tubular bayonet receiving socket member 104. The detachable portion 26 of the housing 25 is attached by positioning the detachable portion 26 for engagement with the integral portion 24, advancing the portion 26 to engage the bayonet cross-pin 68 in conventional bayonet socket slots 106 provided in the bayonet socket member 104. A toggle arm 108 picotally connected with the receiving socket member 104 is used to rotate the socket member 104 to securely engage the cross-pin 68 in the bayonet slots 106. The toggle arm 108 is retained in its recessed lock position shown in FIGS. 4 and 9 by the bias force exerted by a spring member 110, thereby maintaining the detachable portion 26 of the housing 25 firmly secured to the integral portion 24.

Referring again to FIGS. 2 and 3, it should be noted that the elongate portion 28 of the cassette 23 is provided with an elongated keyhole aperture 64 to limit the orientation of the cassette 23 in the housing 25 to only two possible 180° rotated orientations in order to insure alignment of the cassette positive terminal contact apertures with corresponding positive terminal contacts in the housing 25 and concomitant alignment of the cassette negative terminal contact apertures with corresponding negative terminal contacts in the housing 25.

Figure 8:
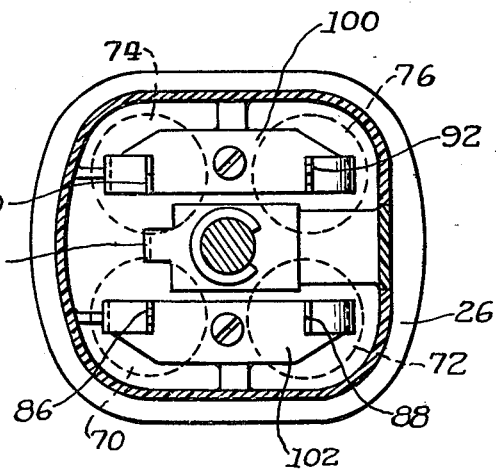
FIG. 8 is a cross-sectional view taken at lines 8—8 of FIG. 4.

At this juncture, consideration can be given to the structural arrangement of the contacts provided in the housing 25. As best illustrated in FIGS. 1, 5, and 7, the positive terminal electrical contacts 80 and 82 mounted in the integral portion 24 of the housing are diagonally positioned relative to one another as are the negative contacts 78 and 84. Similarly, the positive terminal electrical contacts 86 and 92 mounted in the detachable portion 26 of the housing are diagonally positioned relative to one another as are the negative contacts 88 and 90 as illustrated in FIGS. 6 and 8. Each of the positive and negative battery terminal contacts 78, 80, 82, 84, 86, 88, and 90 is spring loaded by its associated mounting member to insure a satisfactory electrical connection with its associated battery terminal. Moreover, the several mounting members 94, 96, 98, 100, and 102 (variously depicted in FIGS. 4 through 8) serve to establish the desired electrical circuit interconnections for the battery cells. Referring in particular to FIGS. 5 and 8, it is seen that the battery cells in the particular embodiment illustrated are connected in series with contact mounting members 96 and 98 (FIG. 5) serving as the negative and positive output terminals, respectively, of the series battery cell circuit. Tracing the connections from FIGS. 5 and 8, it is seen that the negative terminal of battery cell 76 is electrically connected via contact 84 to the negative output terminal and contact mounting member 96. The positive terminal of battery 76, in turn, is connected via contacts 92 and 90 and mounting member 100 to the negative terminal of battery 74. The positive terminal of battery 74, in turn, is connected via contacts 82 and 78 and mounting member 94 to the negative terminal of battery 70. The positive terminal of battery 70 is connected via contacts 86 and 88 and mounting member 102 to the negative terminal of battery 72. Finally, the positive terminal of the battery 72 is connected via terminal contact 80 to positive output terminal and mounting member 98.

As previously noted, each of the positive terminal apertures 36, 42, 46, and 48 of the cassette 23 are provided with associated raised spacer blocks for the purpose of preventing a misconnection between the associated positive contact and a negative battery terminal due to misorientation of the battery in the terminal. As exemplified in FIG. 10, the negative terminal of the battery abuts against the spacer blocks 54 and in this manner is held away from the positive terminal contact element 82. In furtherance of this feature, the positive terminal contact elements 80, 82, 86, and 92 are each configured to have a single central contact point (e.g., contact point 82a shown in FIGS. 7 and 10) which enters the positive terminal aperture provided in the cassette 23 and lateral shoulder portions 82b which abut against the cassette 23 exterior surface adjacent the positive terminal contact aperture to limit the extent of inward penetration of the contact point 82a into the positive terminal contact aperture in the manner illustrated in FIGS. 7 and 10. The negative terminal contact elements 78, 84, 88, and 90, in turn, are each preferably configured to have a pair of laterally spaced points (e.g., points 78a shown in FIG. 1) which can enter the associated negative terminal contact apertures 38, 40, 44, and 50 in the cassette 23 but are too widely spaced to enter the positive terminal contact apertures 36, 42, 46, and 48 which are preferably of slightly smaller diameter than the negative terminal contact apertures.

To load the battery holder assembly, four batteries are inserted into the elongate portion 28 of cassette 23 in proper orientation, the cap portion 30 of the cassette is secured to the elongated portion 28 in either of the only two possible 180° axially rotated orientations, and the cassette 23 is inserted into the integral portion 24 of the receiver housing 25 with the keyhole aperture 64 oriented in either of the only two possible 180° axially rotated orientations for receiving the bayonet cross-pin 68. The detachable portion 26 of the receiver housing is secured in place in engagement with the portion 24 by rotating and locking the toggle lever 108 so that the bayonet cross-pin is secured in its receiving slots 106. It should be noted that the detachable portion 26 of the receiver housing can be secured to the integral portion 24 in only on possible orientation.

It can now be seen that the battery holder assembly of this invention is convenient and easy to use and foolproof in the sense that it will only establish electrical connection with all of the battery cells if the cells are properly loaded in correct polarity orientation in the battery cassette. Moreover, to further insure proper electrical interconnection, the battery cassette itself can only be inserted and secured in the receiver housing in one of two possible correct orientations, and the detachable portion of the receiver housing can be secured to the fixed portion of the receiver housing in only one possible orientation.

What is claimed is:

1. A battery holding assembly for elongate battery cells of the type having a central protruding positive terminal at one end and a negative terminal surface at the opposite end, said assembly comprising:

an elongate cassette for receiving and retaining a predetermined number of said battery cells in a side-by-side assembled relationship, said cassette comprising a first portion and a detachable second portion with one end wall formed as a part of said first portion and an opposite end wall formed as a part of said second portion, said first portion being attachable to said second portion in only two possible 180° rotated orientations;

means projecting longitudinally within said cassette for defining a longitudinal compartment for each of said predetermined number of batter cells, said cassette end walls providing for each battery cell compartment a pair of aligned contact-receiving apertures, a first one of said pair of aligned contact-receiving apertures having a minor diameter and a second one of said pair of contact receiving apertures having a major diameter larger than said minor diameter;

spacer means providing a raised surface region on the interior surface of each of said end walls adjacent the first one of each of said pair of aligned apertures and configured to form a socket for receiving the protruding positive battery terminal only, whereby electrical contact may be prevented with the negative terminal of a battery cell should the battery cell be improperly inserted in said cassette in reversed polarity orientation; and a receiver housing for longitudinally receiving said cassette, said receiver housing having a pair of end walls each including a predetermined number of inwardly protruding electrical contact elements positioned to enter said contact-receiving apertures of said cassette for establishing electrical contact with said battery cells when said battery cells are properly oriented in said cassette, said electrical contact elements including a negative electrical contact element having a dimension larger than the minor diameter and smaller than the major diameter.

2. The invention as defined in claim 1 wherein said receiver housing comprises a first portion and a second detachable portion with one of said receiver housing end walls formed as a part of said first portion and the second of said receiver housing end walls formed as a part of said second portion.

3. The invention defined in claim 2 wherein said inwardly protruding contact elements are each spring urged inwardly to establish effective electrical contact with said battery cells.

4. The invention defined in claim 3 wherein each of said contact elements which is positioned to enter a contact-receiving aperture having one of said sockets associated therewith for receiving only a positive battery terminal is provided with means for limiting the extent of entry of said contact element into said contact-receiving aperture.

* * * * *